W. E. COMAN.
Earth-Auger.
No. 168,454. Patented Oct. 5, 1875.
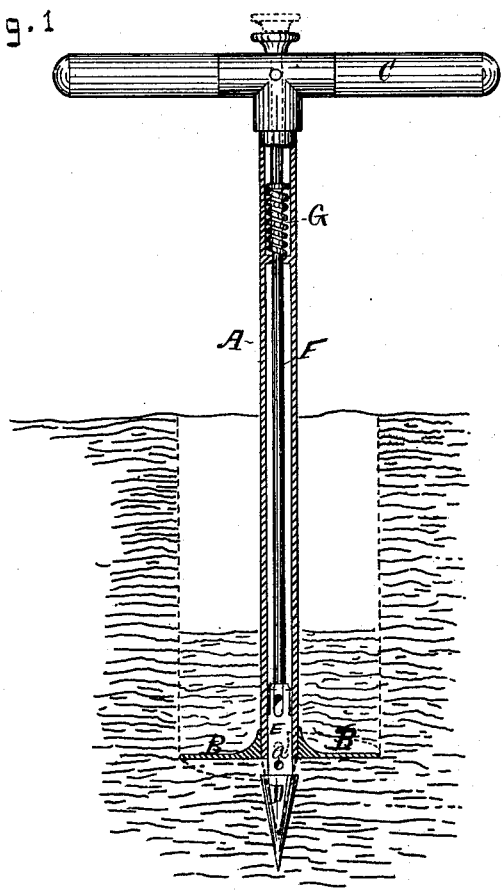
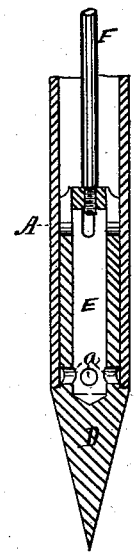

UNITED STATES PATENT OFFICE.

WILLIAM E. COMAN, OF OAK PARK, ILLINOIS.

IMPROVEMENT IN EARTH-AUGERS.

Specification forming part of Letters Patent No. 168,454, dated October 5, 1875; application filed August 25, 1875.

*To all whom it may concern:*

Be it known that I, WILLIAM E. COMAN, of Oak Park, in the county of Cook and State of Illinois, have invented a new and useful Improvement in Earth-Augers; and I do hereby declare the following to be a full, clear, and exact description thereof, which will enable others skilled in the art to which it appertains to make and use the same, reference being had to the accompanying drawing, forming part of this specification, in which—

Figure 1 is a central section of an earth-auger embodying my said invention, and Fig. 2 is an enlarged section of a portion of the shank and point.

Similar letters of reference indicate like parts in both figures of the drawing.

My invention relates more especially to that class of earth-augers employed in excavating post-holes, but may be used in sinking tubular wells; and its object is to provide a means of allowing the air to enter the aperture under the loose earth, thereby preventing the formation of a vacuum when the latter is being removed. To that end it consists in a hollow shank, provided with a loose point arranged to form a valve, the latter adapted to be opened or closed at will, and in the combination of the several parts, as will be more fully understood by the following description and claim.

In the drawing, A represents the shank, to which the cutters B B are attached in the usual manner. This shank is made hollow its entire length, and is provided at its upper end with a handle, C, for rotating the same. D is the point or center for guiding the cutters. This point is provided with a hollow stem, E, adapted to loosely fit the cavity of the shank A, and is so arranged therein as to admit of a free-and-easy longitudinal movement. F is the adjusting-rod, permanently attached to stem E of the point, and extending upward through the cavity of the shank, as shown in Fig. 1, and is provided at its upper end with knob e, by which means the adjusting-rod—consequently the point—may be forced downward by the operator when desired. G is a coiled spring, mounted upon rod F, and so adjusted as to hold the shoulder of point D against the lower end of the shank. The lower extremity of stem E is provided with a series of perforations, a, the latter located at a point slightly above the shoulder of the point. These perforations communicate with the cavity of shank A through the cavity in stem E, as shown in Fig. 2. The upper end of shank A is also provided with a series of perforations, d, as shown in Fig. 1, by which means the air is admitted into the cavity of the shank.

My invention is operated as follows: When the loose earth is to be removed from the aperture, the operator raises the auger slightly, which causes the atmospheric pressure of the air in the shank to overbalance the tension of the spring, when the point descends sufficiently to cause the perforations in the stem to pass below the end of the shank, thus allowing a current of air to pass through the shank into the aperture below the loose earth, when the latter can be easily removed.

If the stem should become wedged in the cavity of the shank, so as to prevent the atmospheric pressure from forcing the point downward to allow the air to pass into the aperture under the loose earth, as is sometimes the case, the operator can readily force the point downward by bearing down on the knob on the adjusting-rod.

It is seen by reference to the drawing that the perforations in stem E are so arranged as to be within the shank when the point is held to its normal position by the action of the spring, the object of which is to prevent them from being filled with loose earth when the cutters are rotated.

Having thus described my invention, I claim—

In combination with the hollow shank A and loose point D, arranged as described, the spring G and adjusting-rod F, the latter extending through the cavity in the shank, as specified.

WILLIAM E. COMAN.

Witnesses:
J. T. WHIPPLE,
N. H. SHERBURNE.